United States Patent [19]

Graves et al.

[11] Patent Number: 5,137,293
[45] Date of Patent: Aug. 11, 1992

[54] VEHICLE AUXILIARY ASSIST STEP ASSEMBLY

[75] Inventors: Lee K. Graves, Bloomfield Hills; John W. Frankila, Jackson, both of Mich.

[73] Assignee: Wickes Manufacturing Company, Southfield, Mich.

[21] Appl. No.: 676,366

[22] Filed: Mar. 28, 1991

[51] Int. Cl.$^5$ .................................................. B60R 3/00
[52] U.S. Cl. ..................................... 280/163; 280/169
[58] Field of Search ............... 280/163, 164.1, 164.2, 280/169, 166; 403/408.1, 388; 293/128

[56] References Cited

U.S. PATENT DOCUMENTS

| | | | |
|---|---|---|---|
| 1,426,564 | 8/1922 | Hagglund | 280/163 |
| 1,679,195 | 7/1928 | Williams | 280/164.1 |
| 1,718,428 | 6/1929 | McNulty | 280/164.2 X |
| 2,559,123 | 7/1951 | Jackson | 280/164.2 X |
| 3,213,273 | 10/1965 | Zagel | 403/388 X |
| 3,939,683 | 2/1976 | van Geffen | 72/71 |
| 4,411,552 | 10/1983 | Lanham et al. | 403/388 |
| 4,935,638 | 6/1990 | Straka | 280/163 X |
| 4,943,085 | 7/1990 | Straka | 280/163 X |

*Primary Examiner*—Andres Kashnikow
*Assistant Examiner*—Richard Camby
*Attorney, Agent, or Firm*—David A. Greenlee

[57] ABSTRACT

A step support for mounting an exterior assist step on a vehicle body structure comprises a U-shaped tubular support member having a pair of intermediate portions interconnecting a step-supporting portion and a pair of spaced free ends which are mounted to the body structure, with the intermediate and step-supporting portions projecting outwardly of the vehicle. A plurality of pairs of aligned upper and lower through holes are formed in the step-supporting portion for receiving bolts therethrough to mount the step on the support. A reinforcing collar is formed integrally on the tubing adjacent each through hole by flow drilling to enable tightening of the fasteners to clamp the step and support together without deforming the tubing. A pair of auxiliary support stirrups are each welded to the tubular support member and have their free ends adjustably mounted on the body structure to the body structure to provide a 4-point mounting of the tubular support member on the body structure. Each stirrup is made from tubing that is flattened at the stirrup bottom where it engages the tubular support member and is resistance projection welded thereto.

14 Claims, 2 Drawing Sheets

VEHICLE AUXILIARY ASSIST STEP ASSEMBLY

BACKGROUND OF THE INVENTION

This invention relates generally to vehicle steps for enhancing passenger access to vehicles and, more particularly, to a support for an exteriorly-mounted vehicle step.

When passenger vehicles were first developed, they had their passenger compartment floorboards located above the axles high off the ground. This arrangement made passenger access to the vehicle difficult, especially for short passengers, since a considerable step up was required by passengers to enter the vehicle and a similar step down was necessary to exit the vehicle. This was a particularly aggravating situation for women during the various fashion periods which featured tight skirts.

To alleviate this problem, many vehicles provided an assist step positioned intermediate the high floorboard and the ground. Later, due to styling considerations, cars were provided with so-called "running boards" which were located subjacent the vehicle's side doors and extended between the front and rear fenders. This provided a continuous passenger assist "step".

In the 1950's, engineers were able to lower the passenger compartment to a position between the front and rear axles, which lowered the vehicle floorboard. This eliminated the need for an assist step, much to the delight of stylists. This enabled stylists to eliminate the running board altogether. In its place, a narrow threshold plate was provided on the body and hidden by the door.

Now, four-wheel drive sport/utility vehicles, campers and pickup trucks are becoming increasingly popular. Because of the bulky running gear required to provide off-road, utility or four-wheel drive capability, these vehicles have much higher ground clearance than passenger cars. This again creates a need for an assist step to aid passenger access to these high clearance vehicles.

Production vehicles of this type are usually not provided with an assist step. These auxiliary devices are normally installed by aftermarket suppliers. The auxiliary assist steps now commercially available are universal kits which comprise a step and an assortment of channels that are multiply drilled for attachment by bolts to various parts of the anatomy of a variety of vehicles. Since these kits are designed to fit all types and makes of vehicle, they usually do not fit any of them well. Many of them are more concerned with style than utility; consequently, they are frequently not sturdy enough to support substantial weight and are difficult and time-consuming to install.

There is a need for an auxiliary assist step assembly which is rugged and can support substantial weight, yet is simple in design, comprises a minimal number of pieces, and is consequently simple to install.

SUMMARY OF THE INVENTION

It is therefore an object of this invention to provide an auxiliary assist step assembly that incorporates a support that is rugged, simple and easy to install.

Accordingly, in one aspect, this invention features a step support for mounting an exterior assist step on a vehicle body structure which comprises a U-shaped tubular support member having a pair of intermediate portions interconnecting a step-supporting portion and a pair of spaced free ends which are mounted to the body structure, with the intermediate and step-supporting portions projecting outwardly of the vehicle. A plurality of pairs of aligned upper and lower through holes are formed in the step-supporting portion for receiving bolts therethrough to mount the step on the support. A reinforcing collar is formed integrally on the tubing adjacent each through hole to enable tightening of the fasteners to clamp the step and support together without deforming the tubing. This support collar is preferably integrally formed by flow drilling.

In another aspect, this invention features a pair of auxiliary supports each attached to the tubular support member and to the body structure to provide a 4-point mounting of the tubular support member on the body structure. These auxiliary supports are preferably stirrups which cradle the tubular support member and have their free ends adjustably mounted on the body structure; each stirrup is made from tubing that is flattened at the stirrup bottom where it engages the tubular support member and is resistance projection welded thereto.

These and further objects and features of this invention will become more readily apparent upon reference to the following detailed description of a preferred embodiment, as illustrated in the accompanying drawings, in which:

DETAILED DESCRIPTION OF A PREFERRED EMBODIMENT

Figure 1:
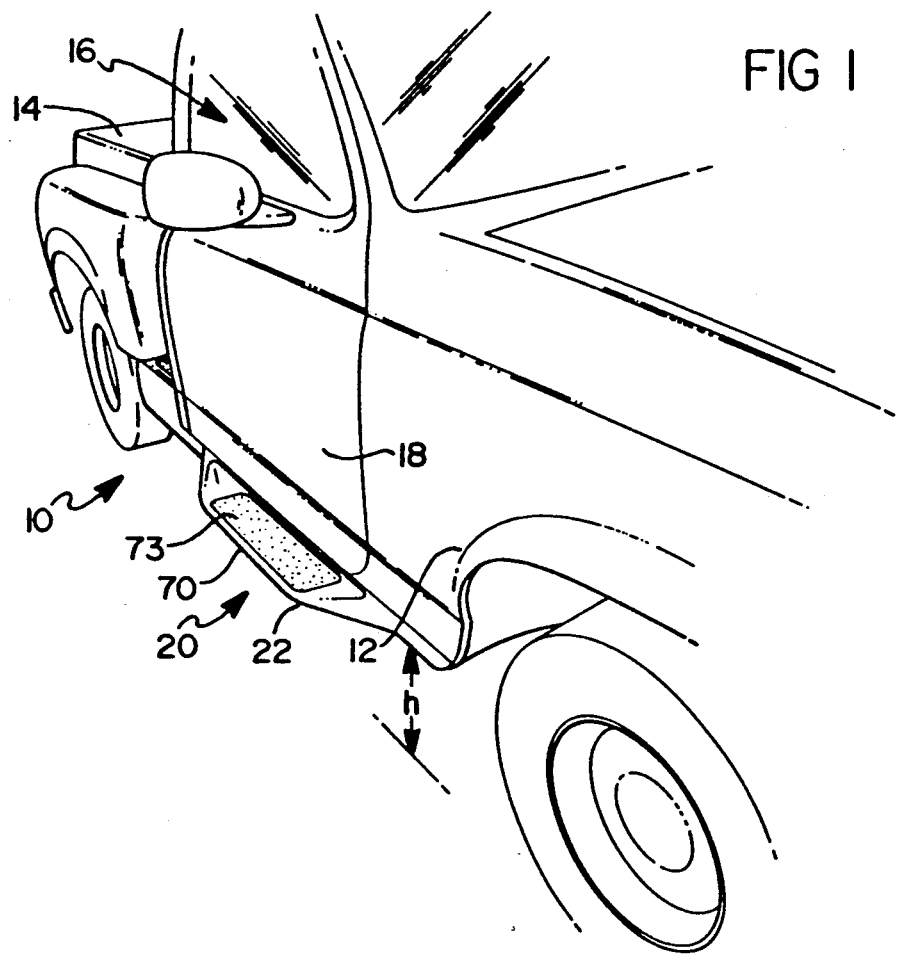
FIG. 1 is a partial perspective view of a pickup truck incorporating an auxiliary step assembly according to this invention.

Referring now to FIG. 1 of the drawings, a vehicle in the form of a pickup truck 10 has a body structure 12 that incorporates a rear cargo bed 14 and a forward passenger compartment 16. Passengers gain access to compartment 16 through a door 18 in body 12.

Pickup truck 10 has a high ground clearance or body height "h" which locates the floor of passenger compartment 16 a considerable distance from the ground. This makes access to compartment 16 through door 18 much more difficult than in a conventional passenger vehicle, or car. To assist in passenger access, an external auxiliary step assembly 20 including a step 22 is provided subjacent the door 18.

Figure 2:
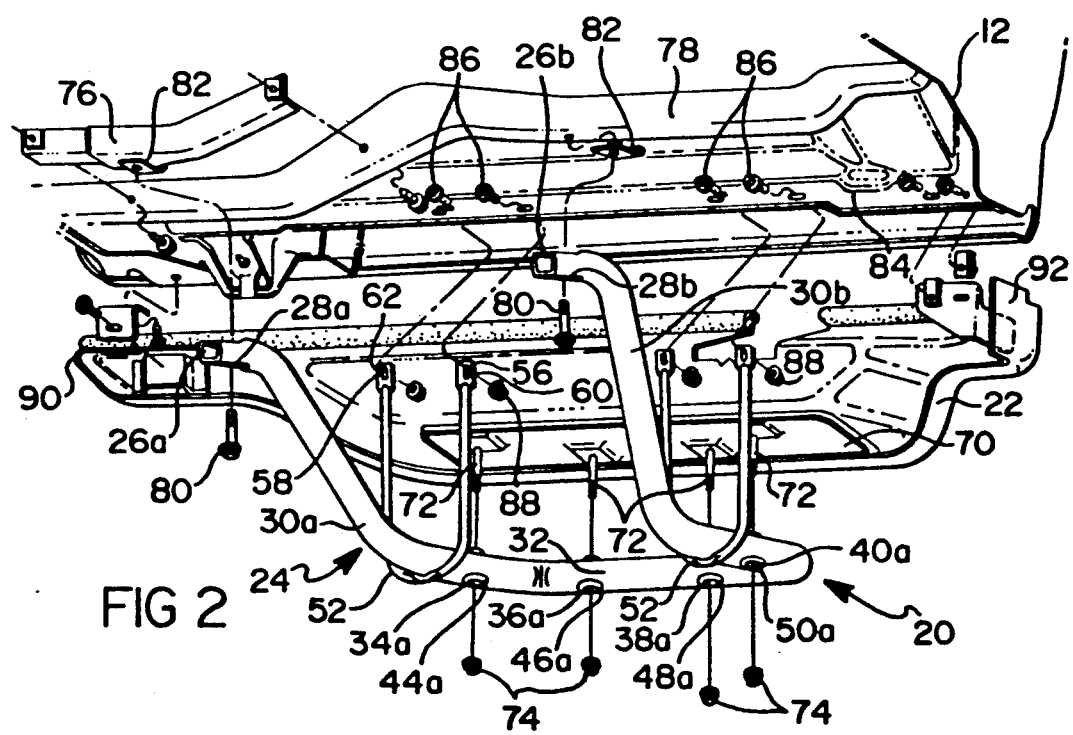
FIG. 2 is an exploded perspective view of a portion of the underside of the truck of FIG. 1, detailing the step support and its mounting to the truck body structure.

FIG. 2 shows the structure of step assembly 20 in detail. A step support member 24 is preferably made of steel tubing and has a generally three-dimensional U-shaped configuration. It comprises a pair of free ends 26a, 26b that are flatted and drilled with aligned through holes 28a, 28b. Support member 24 further includes intermediate portions 30a, 30b which extend outwardly and downwardly from free ends 26a, 26b.

Figure 3:
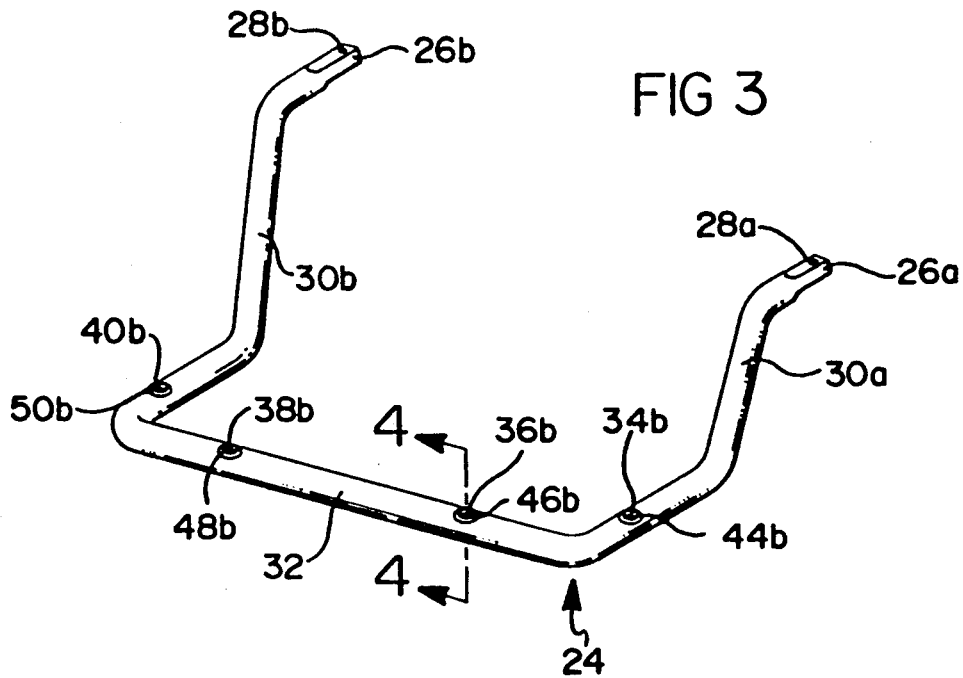
FIG. 3 is a perspective view of the support of FIG. 2.
Figure 4:
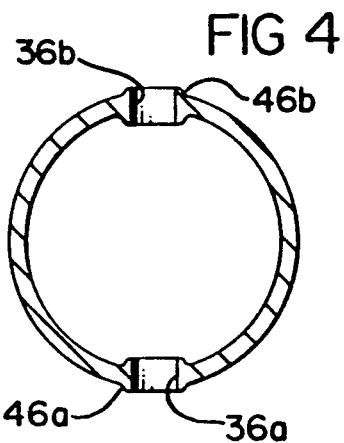
FIG. 4 is an enlarged sectional view taken on line 4—4 of FIG. 3.

The intermediate portions 30a, 30b terminate in a generally horizontal U-shaped step-supporting portion 32. As shown in FIGS. 2-4, four vertically aligned pairs of through holes 34a & 34b, 36a & 36b, 38a & 38b, and 40a & 40b are drilled in step-supporting portion 32 by a technique known as flow drilling. The flow drilling forms integral collars 44a & 44b, 46a & 46b, 48a & 48b, and 50a & 50b around the through holes, as best seen in FIG. 4.

As shown in FIG. 3, a pair of identical auxiliary supports 52 are provided for step assembly 20. These auxiliary supports 52 are welded to the intermediate portions 30a, 30b, as will now be described with particular reference to FIGS. 5 and 6. Each auxiliary support 52 is in the form of a U-shaped stirrup having its free ends 56, 58 flattened and incorporating adjustment slots 60, 62.

Figure 5:
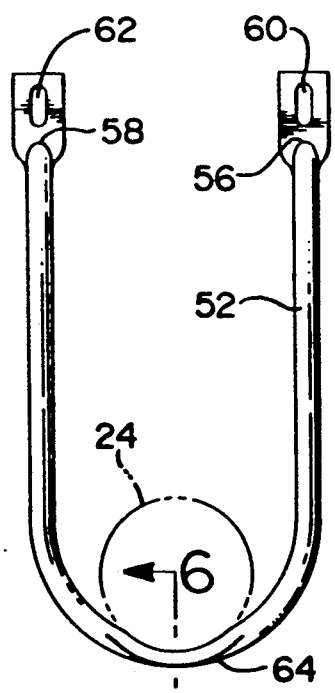
FIG. 5 is an enlarged elevation of an auxiliary support shown in FIG. 2.
Figure 6:
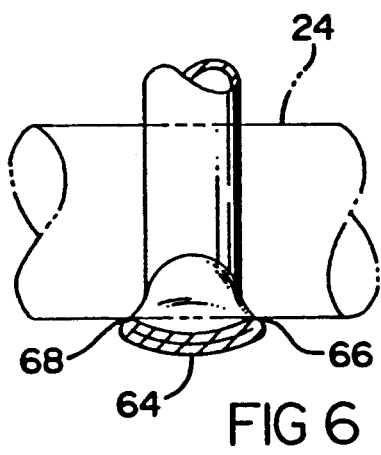
FIG. 6 is an enlarged sectional view taken on line 6—6 of FIG. 5.

The crotch 64 of the stirrup is flattened to form a pair of arcuate projections 66, 68 having a contour complementary to that of tubular support member 24, as illustrated in FIG. 5. The stirrups 52 are secured to the tubular support member 24 by a well-known welding technique known as resistance projection welding. This welds the projections 66, 68 to the exterior of tubing 24, as shown in FIGS. 6.

After the stirrups are secured to the tubular support member 24, step 22 is mounted on the tubular support member 32 as follows. The treadle portion 70 of step 20 incorporates four drilled depressions which receive the heads of downwardly-extending elongated bolts 72. Step 20 is placed on tubular step-supporting portion 32 so that the threaded shanks of the bolts 72 extend through the pairs of aligned through holes 34b & 34a, 36b & 36a, 38b & 38a, and 40b & 40a. Nuts 74 are engaged with the bolt shanks and tightened to secure the step rigidly to the support member 24. A tread 73 is then placed on treadle portion 70 to cover the heads of the bolts.

Step assembly 20 can be easily and quickly mounted to the body structure 12 of pickup truck 10, as will now be described. An added angle 76 may be conventionally bolted to body structure 12, if needed. Tubular support member 24, with stirrups 52 attached, is attached to angle 76 and a body channel 78 by long bolts 80 and clips 82. Next, the ends 56, 58 of stirrups 52 are mounted to a body flange 84 by short bolts 86 and bolts 88. The horizontality of step treadle is assured by the vertical adjustment of the stirrups 52 relative to body structure 12 enabled by the elongated slots 60, 62.

If holes 34a, 34b, 36a, 36b, 38a, 38b, 40a and 40b were merely conventionally drilled in tubular support member 24, the tubing would be weakened at these points. In this case, the subsequent clamping forces caused by tightening nuts 74 on bolts 72 could easily deform and flatten the tubing at those points, thus weakening the step support. This weakening is obviated by using the flow drilling technique to drill the holes. Flow drilling plasticizes the drilled tubing material and flows it to form the 46a, 46b collars surrounding the holes 36a, 36b shown in FIG. 4. These collars strengthen the tubing at that point and prevent any collapse when the nuts are tightened on the bolts.

After the step assembly 20 is structurally secured to body structure 12 as just described, assembly flanges 90, 92 are bolted to the body structure 12 for cosmetic purposes. These flange attachments serve no structural purpose for step assembly 20.

Thus, the design of the tubular support for the step assembly described herein provides a rugged, strong auxiliary vehicle assist step that incorporates a minimum number of components that can be easily and quickly installed. Following the welding of the auxiliary support stirrups to the unitary tubular support member and mounting of the step thereon, only bolting to drilled holes in the vehicle body structure is required to quickly attach the step assembly to the vehicle body structure. The only adjustment needed is provided by the adjustment slots in the stirrup free ends.

Preferably, the tubular support and the step assembly are so constructed to enable the step to support at least 300 pounds and, ideally, at least 600 pounds. This enables the step assembly to support any size passenger. While only a preferred embodiment has been illustrated and described, obvious modifications are contemplated within the scope of this invention and the appended claims.

We claim:

1. A step support for mounting an exterior assist step on a vehicle having body structure, comprising
    a unitary tubular support member form of a single piece of tubing comprising a pair of spaced free ends, a U-shaped step-supporting portion, and intermediate portions interconnecting the free ends with the legs of the U-shaped portion,
    means for mounting the free ends to the body structure, with the intermediate and step-supporting portions projecting outwardly of the vehicle,
    a plurality of pairs of aligned upper and lower through holes formed in the step-supporting portion for receiving fasteners therethrough to mount the step on the support, and
    a reinforcing collar formed integrally on the tubing adjacent each through hole to enable tightening of the fasteners to clamp the step and support together without deforming the tubing.

2. The step support of claim 1, wherein the integral reinforcing collars are of tubing material displaced during formation of the holes formed by flow drilling.

3. The step support of claim 1, wherein the step abuts the collars surrounding the upper holes and the fasteners are nut and bolt assemblies which engage the reinforcing collars surrounding the bottom holes and extend through the tube to engage the step, and are thereafter tightened to clamp the tube.

4. The step support of claim 1, further including a pair of auxiliary supports each attached to the tubular support member and to the body structure, thus comprising with the free ends four spaced means for mounting the tubular support member on the body structure.

5. The step support of claim 4, wherein the auxiliary supports are stirrups which cradle the tubular support member and have their free ends adjustably mounted on the body structure.

6. The step support of claim 5, wherein each stirrup is made from tubing that is flattened at the stirrup bottom where it engages the tubular support member and is resistance projection welded thereto.

7. A step assembly for mounting to a vehicle body structure subjacent a vehicle passenger door and capable of supporting at least a 300 pound weight, comprising
    a step member for assisting passenger access to the vehicle through the door,
    a unitary tubular support member formed of a single piece of steel tubing comprising a pair of spaced free ends, a U-shaped step-supporting portion, and intermediate portions interconnecting the free ends with the legs of the U-shaped portion, means for mounting the free ends to the body structure, with the intermediate portions projecting outwardly of the vehicle to locate the step-supporting portion subjacent a vehicle door, a plurality of pairs of aligned upper and lower through holes formed in the step-supporting portion for receiving fasteners therethrough to mount the step on the support, and a reinforcing collar formed integrally on the tubing adjacent each through hole to enable tightening of the fasteners to clamp the step and support together without deforming the tubing.

8. The step assembly of claim 7, wherein the integral reinforcing collars are formed of tubing material displaced during formation of the holes by flow drilling.

9. The step assembly of claim 7, wherein the step abuts the collars surrounding the upper holes and the fasteners are nut and bolt assemblies which engage the reinforcing collar surrounding the bottom holes and extend through the tube to engage the step, and are thereafter tightened to clamp the tube.

10. The step assembly of claim 7, further including a pair of auxiliary supports each attached to the tubular support member and to the body structure, thus comprising with the free ends four spaced means for mounting the tubular support member on the body structure.

11. The step assembly of claim 10, wherein the auxiliary supports are stirrups which cradle the tubular support member and have their free ends adjustably mounted on the body structure.

12. The step assembly of claim 11, wherein each stirrup is made from tubing that is flattened at the stirrup bottom where it engages the tubular support member and is resistance projection welded thereto.

13. The step assembly of claim 7, wherein the tubular support member comprises a piece of tubing bent such that the intermediate portions extend outwardly and downwardly from the free ends and the step-supporting portion extends outwardly therefrom in a U-shape to locate the step on the vehicle outwardly and downwardly of the attachment of the free ends to the body structure.

14. The step assembly of claim 13, wherein the integral reinforcing collars are formed of tubing material displaced during formation of the holes by flow drilling.

* * * * *